United States Patent
Chung (10) Patent No.: US 8,215,337 B2
(45) Date of Patent: Jul. 10, 2012

(54) VALVE FOR WATER FAUCET

(75) Inventor: Tien-Ho Chung, Changhua Hsien (TW)

(73) Assignee: Ching Hann Souvenir Co., Ltd., Changhua Hsien (TW)

( * ) Notice: Subject to any disclaimer, the term of this patent is extended or adjusted under 35 U.S.C. 154(b) by 580 days.

(21) Appl. No.: 12/400,770

(22) Filed: Mar. 9, 2009

(65) Prior Publication Data

US 2010/0224813 A1 Sep. 9, 2010

(51) Int. Cl.
*F16K 11/20* (2006.01)
*F16K 31/06* (2006.01)
*F15B 13/00* (2006.01)
(52) U.S. Cl. ............... 137/597; 137/595; 137/271
(58) Field of Classification Search .............. 137/594, 137/597, 602, 603, 896, 897, 270, 271, 872, 137/875, 876, 625, 884
See application file for complete search history.

(56) References Cited

U.S. PATENT DOCUMENTS

| 5,070,906 | A * | 12/1991 | Orlandi | 137/606 |
| 7,143,786 | B2 * | 12/2006 | Romero | 137/606 |
| 7,334,604 | B1 * | 2/2008 | Hwang | 137/597 |
| 2004/0123911 | A1 * | 7/2004 | Bartkus et al. | 137/625.46 |

* cited by examiner

*Primary Examiner* — John Rivell
*Assistant Examiner* — Hailey K Do (57) ABSTRACT

A valve for a water faucet includes a base, a seat unrotatably mounted on base, a valve set mounted on the seat, a disk unrotatably mounted on the first valve set, and a housing mounted on the disk. The valve set includes a pivotable valve pivotally mounted on the first portion of the seat and a rotatable valve rotatably mounted on the second portion of the seat. The disk, the rotatable valve, the pivotable valve, the seat, and the base are sequentially received in the housing.

13 Claims, 11 Drawing Sheets

VALVE FOR WATER FAUCET

BACKGROUND OF THE INVENTION

1. Field of the Invention

The present invention relates to a valve, and more particularly to a valve for a water faucet.

2. Description of Related Art

A conventional valve for a water faucet has a top-to-bottom type and a bottom-to-bottom type for satisfying two different kinds of faucet systems. The conventional valve of top-to-bottom type means that a water supply is connected to a top of the valve and a water exhaust is connected to a bottom of the valve. The conventional valve of bottom-to-bottom type means that the water supply is connected to the bottom of the valve and a water exhaust is connected to the bottom of the valve.

However, the top-to-bottom type and the bottom-to-bottom type valves have two different kinds of structures. In the manufacture, it costs more for producing the two types of the conventional valves. Furthermore, it is inconvenient to carry the two types of the conventional valves when assembling.

The present invention has arisen to mitigate and/or obviate the disadvantages of the conventional valve.

SUMMARY OF THE INVENTION

The main objective of the present invention is to provide an improved valve for a water faucet for integrating two different types of valves.

To achieve the objective, a first embodiment of the valve for a water faucet in accordance with the present invention comprises a seat. The seat includes a first portion formed thereon and a second portion upwardly extending from the first portion. The first portion has a first outlet hole defined therein and extended therethrough. The first portion has a third inlet hole defined therein and extended therethrough. The second portion of the seat has a second outlet hole defined therein and extended therethrough. The second portion has a fourth inlet hole defined therein and extended therethrough. A first valve set is mounted on the seat. The first valve set includes a pivotable valve pivotally mounted on the first portion of the seat and a rotatable valve rotatably mounted on the second portion of the seat. The pivotable valve has a first groove defined in a top thereof. The first groove has a first through hole defined in a bottom thereof and extended therethrough for selectively communicating with first outlet hole in the seat. The rotatable valve has a second groove defined in a top thereof. The second groove has a second through hole defined in a bottom thereof and extended therethrough for selectively communicating with the second outlet hole in the seat. The rotatable valve has a third groove defined in the top thereof and extended therethrough. The third groove in the rotatable valve is communicated with the first groove in the pivotable valve. A housing is mounted on the first valve set. The first valve set and the seat are sequentially received in the housing. The housing has a first inlet and a second inlet defined in a top thereof and extended therethrough for respectively communicating with the third groove and the second groove in the rotatable valve.

A second embodiment of the valve for a water faucet in accordance with the present invention comprises the base, the seat unrotatably mounted on the base, a second valve set mounted on the base, the disk unrotatably mounted on the rotatable valve, and the housing mounted on the disk. The elements and effects of the second embodiment which are the same with the first embodiment are not described, only the differences are described. The second valve set includes a pivotable valve pivotally mounted on the first portion of the seat and a rotatable valve rotatably mounted on the second portion of the seat. The pivotable valve has a first groove defined in a bottom thereof. The first groove is communicated with the third inlet hole in the seat and selectively communicated with the first outlet hole in the seat. The rotatable valve has a second groove defined in a bottom thereof. The second groove is communicated with the fourth inlet hole and selectively communicated with the second outlet hole.

Further benefits and advantages of the present invention will become apparent after a careful reading of the detailed description with appropriate reference to the accompanying drawings.

DETAILED DESCRIPTION OF THE INVENTION

Referring to the drawings and initially to FIGS. 1-5, a first embodiment of a valve for a water faucet in accordance with the present invention comprises a base (14), a seat (2) unrotatably mounted on base (14), a first valve set (3) mounted on the seat (2), a disk (5) unrotatably mounted on the first valve set (3), and a housing (1) mounted on the disk (5).

Figure 1:
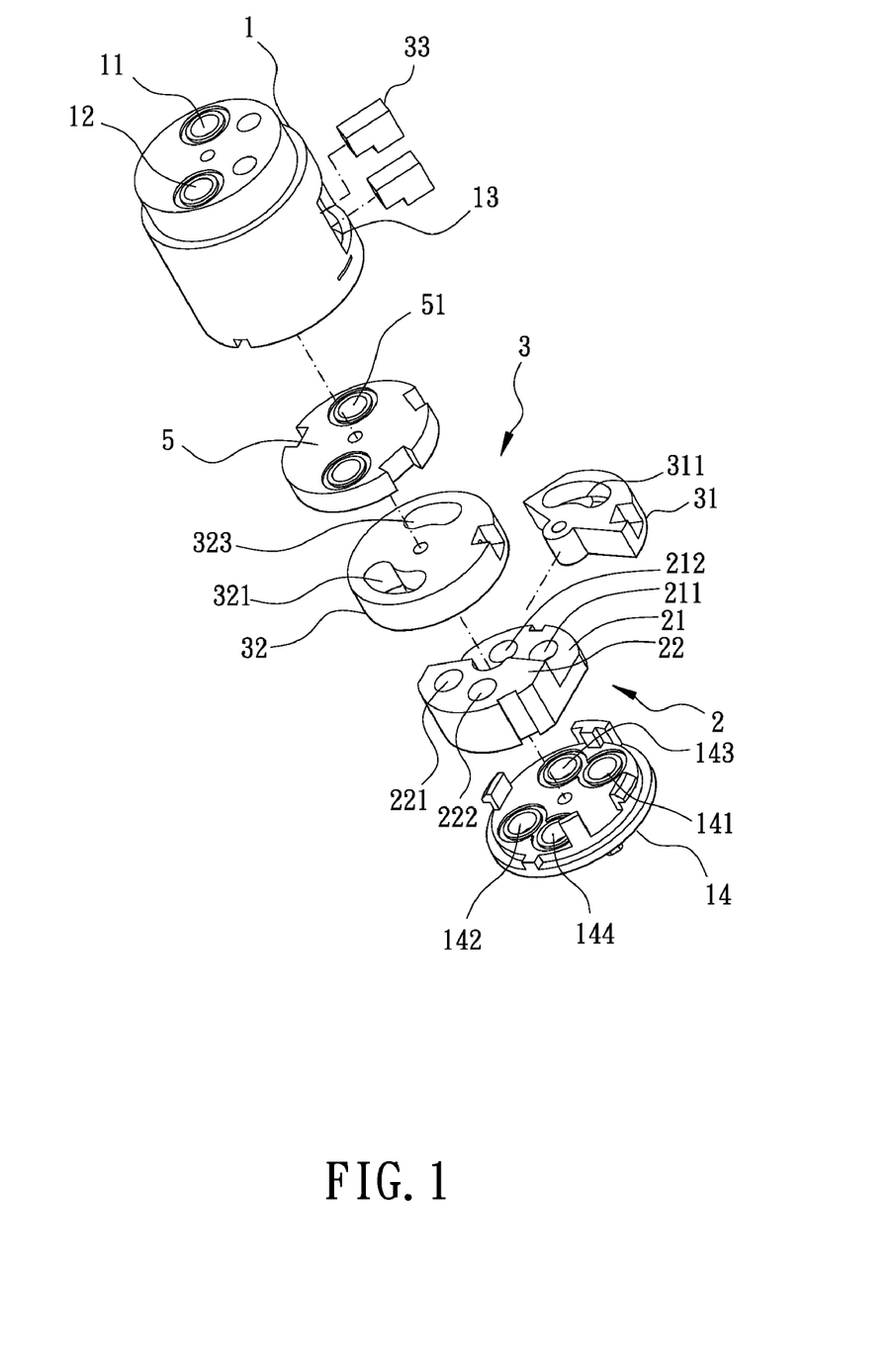
FIG. 1 is an exploded perspective view of a valve for a water faucet in accordance with the present invention.

The base (14) has a first guiding hole (141), a second guiding hole (142), a third guiding hole (143), and a fourth guiding hole (144) respectively defined therein and extended therethrough for guiding water from the valve. The first guiding hole (141) is abutted against the third guiding hole (143) and the second guiding hole (142) is abutted against the fourth guiding hole (144).

The seat (2) includes a first portion (21) formed thereon and a second portion (22) upwardly extending from the first portion (21). The first portion (21) has a first outlet hole (211) defined therein and extended therethrough. The first portion (21) has a third inlet hole (212) defined therein and extended therethrough. The second portion (22) has a second outlet hole (221) defined therein and extended therethrough. The second portion (22) has a fourth inlet hole (222) defined therein and extended therethrough. The first outlet hole (211) is communicated with the first guiding hole (141). The second outlet hole (221) is communicated with the second guiding hole (142). The third inlet hole (212) is communicated with the third guiding hole (143). The fourth inlet hole (222) is communicated with the fourth guiding hole (144).

Figure 2:
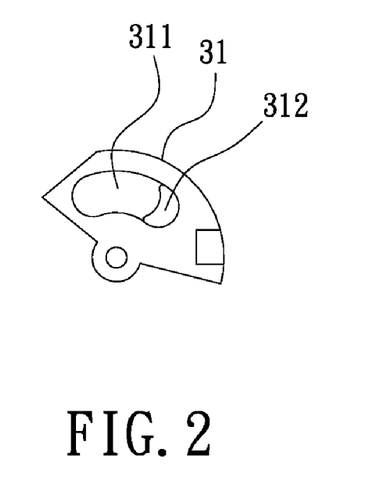
FIG. 2 is an enlarged plan view of the pivotable valve of FIG. 1 shown a top of the pivotable valve.
Figure 3:
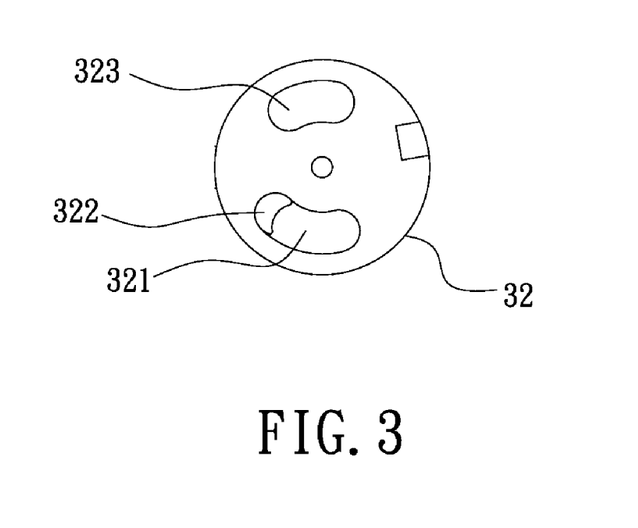
FIG. 3 is an enlarged plan view of the rotatable valve of FIG. 1 shown a top of the rotatable valve.
Figure 4:
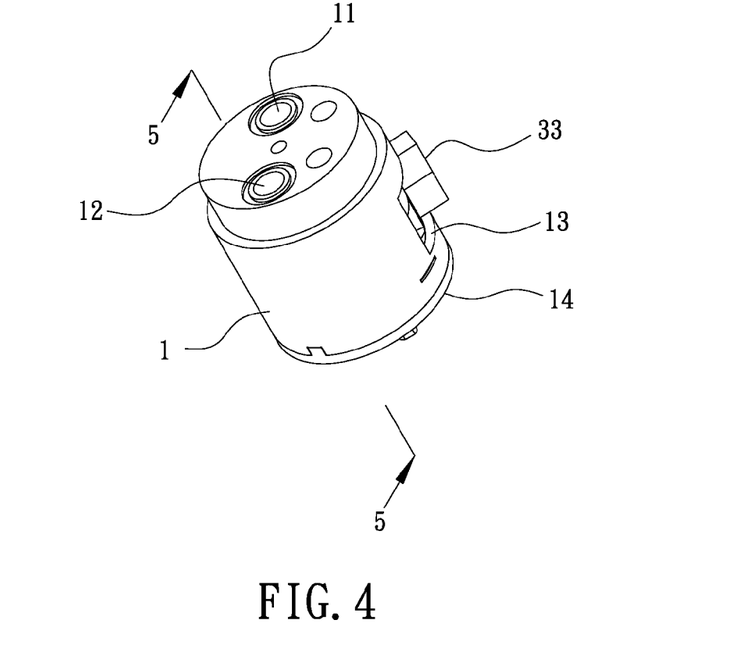
FIG. 4 is an assembled perspective view of the valve for the water faucet in accordance with the present invention.
Figure 5:
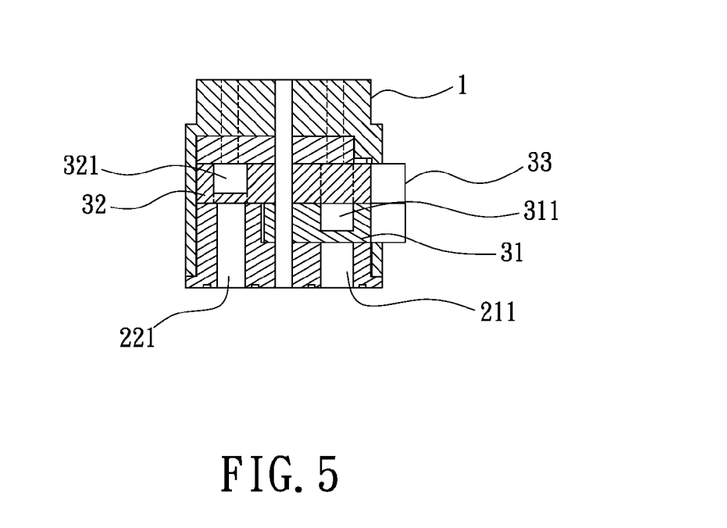
FIG. 5 is a cross-sectional view of the valve for the water faucet in accordance with the present invention taken along the line 5-5 in FIG. 4.
Figure 6:
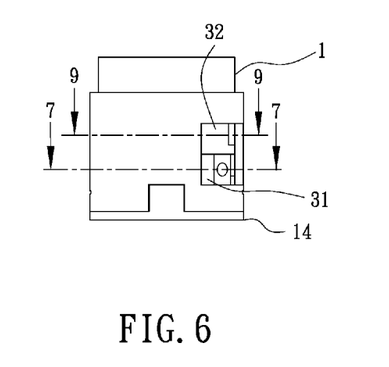
FIG. 6 is a side plan view in FIG. 4.
Figure 7:
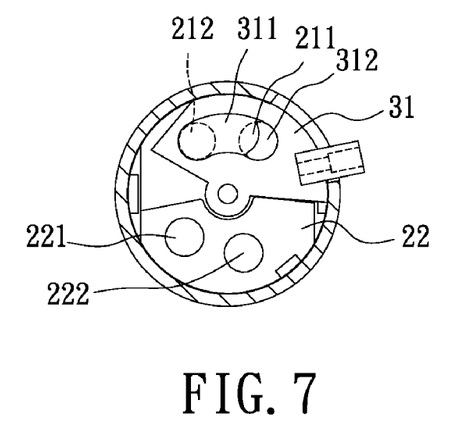
FIG. 7 is a cross-sectional operational view of the valve of the water faucet in accordance with the present invention taken along the line 7-7 in FIG. 6.
Figure 8:
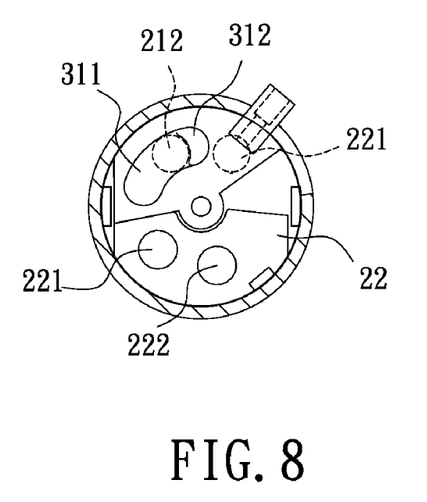
FIG. 8 is an operational view of the pivotable valve in FIG. 7 when the pivotable valve is pivoted.
Figure 9:
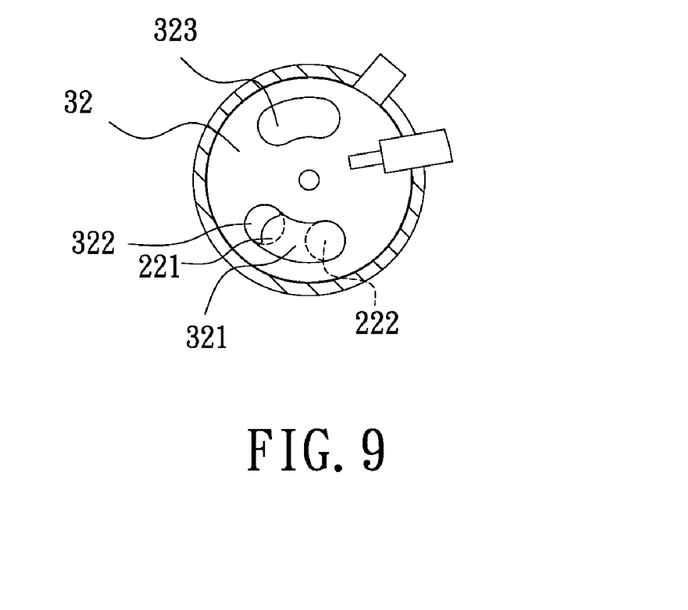
FIG. 9 is a cross-sectional operational view of the valve for the water faucet in accordance with the present invention taken along the line 9-9 in FIG. 6.
Figure 10:
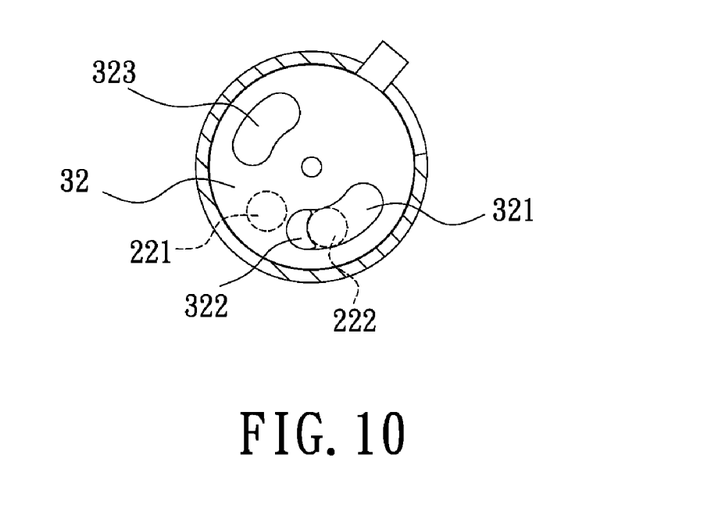
FIG. 10 is an operational view of the rotatable valve in FIG. 9 when the rotatable valve is rotated.

The first valve set (3) includes a pivotable valve (31) pivotally mounted on the first portion (21) of the seat (2) and a rotatable valve (32) rotatably mounted on the second portion (22) of the seat (2). The pivotable valve (31) has a fan-shaped structure. The pivotable valve (31) has a first curved groove (311) defined in a top thereof. The first curved groove (311) has a first through hole (312) defined in a bottom thereof and extended therethrough. The first through hole (312) in the pivotable valve (31) is selectively communicated with first outlet hole (211) in the seat (2). The pivotable valve (31) has a pivot being co-axial with an axle of the rotatable valve (32). The rotatable valve (32) has a second curved groove (321) defined in a top thereof. The second curved groove (321) has a second through hole (322) defined in a bottom thereof and extended therethrough. The rotatable valve (32) has a third curved groove (323) defined in the top thereof and extended therethrough. The second curved groove (321) and the third curved groove (323) are approximately diametrical mirror images to each other. The third curved groove (323) in the rotatable valve (32) is communicated with the first curved groove (311) in the pivotable valve (31). The second through hole (322) in the rotatable valve (32) is selectively communicated with the second outlet hole (221) in the seat (2).

The disk (5) has two holes (51) defined therein and extended therethrough. The two holes (51) are respectively communicated with the second curved groove (321) and the third curved groove (323).

The housing (1) has an inverted bucket-shaped structure. The housing (1) has a first inlet (11) and a second inlet (12) defined in a top thereof and extended therethrough for communicating with the two holes (51) in the disk (5). The housing (1) has an opening (13) laterally defined therein. The disk (5), the rotatable valve (32), the pivotable valve (31), the seat (2), and the base (14) are sequentially received in the housing (1). Two adjusting bars (33) are respectively laterally assembled with the rotatable valve (32) and the pivotable valve (31) via the opening (13) in the housing (1) such that the rotatable valve (32) and the pivotable valve (31) are restrictedly rotated/pivoted due to the opening (13).

When operating, as FIGS. 6-10 shown, the first inlet (11) and the second inlet (12) in the housing (1) are respectively connected to a water supply (not shown) for adapting to a top-to-bottom faucet system (not shown).

The first inlet (11) is communicated with the third curved groove (323) via the corresponding hole (51) in the disk (5). When the pivotable valve (31) is restrictedly pivoted toward the fourth inlet hole (222) in the seat (2), the first through hole (312) in the first curved groove (311) in the pivotable valve (31) is communicated with first outlet hole (211) in the first portion (21) of the seat (2) such that the first inlet (11) is communicated with the first guiding hole (141) in the base (14). When the pivotable valve (31) is restrictedly pivoted toward the second outlet hole (221) in the seat (2), the first through hole (312) in the first curved groove (311) in the pivotable valve (31) is blocked by the first portion (21) of the seat (2) such that the first inlet (11) is not communicated with the first guiding hole (141) in the base (14). When the rotatable valve (32) is restrictedly clockwise rotated, the second through hole (322) is communicated with second outlet hole (221) in the second portion (22) of the seat (2) such that the second inlet (12) in the housing (1) is communicated the second guiding hole (142) in the base (14). When the rotatable valve (32) is restrictedly counter-clockwise rotated, the second through hole (322) is blocked by the second portion (22) of the seat (2) such that the second inlet (12) is not communicated the second guiding hole (142) in the base (14).

Figure 11:
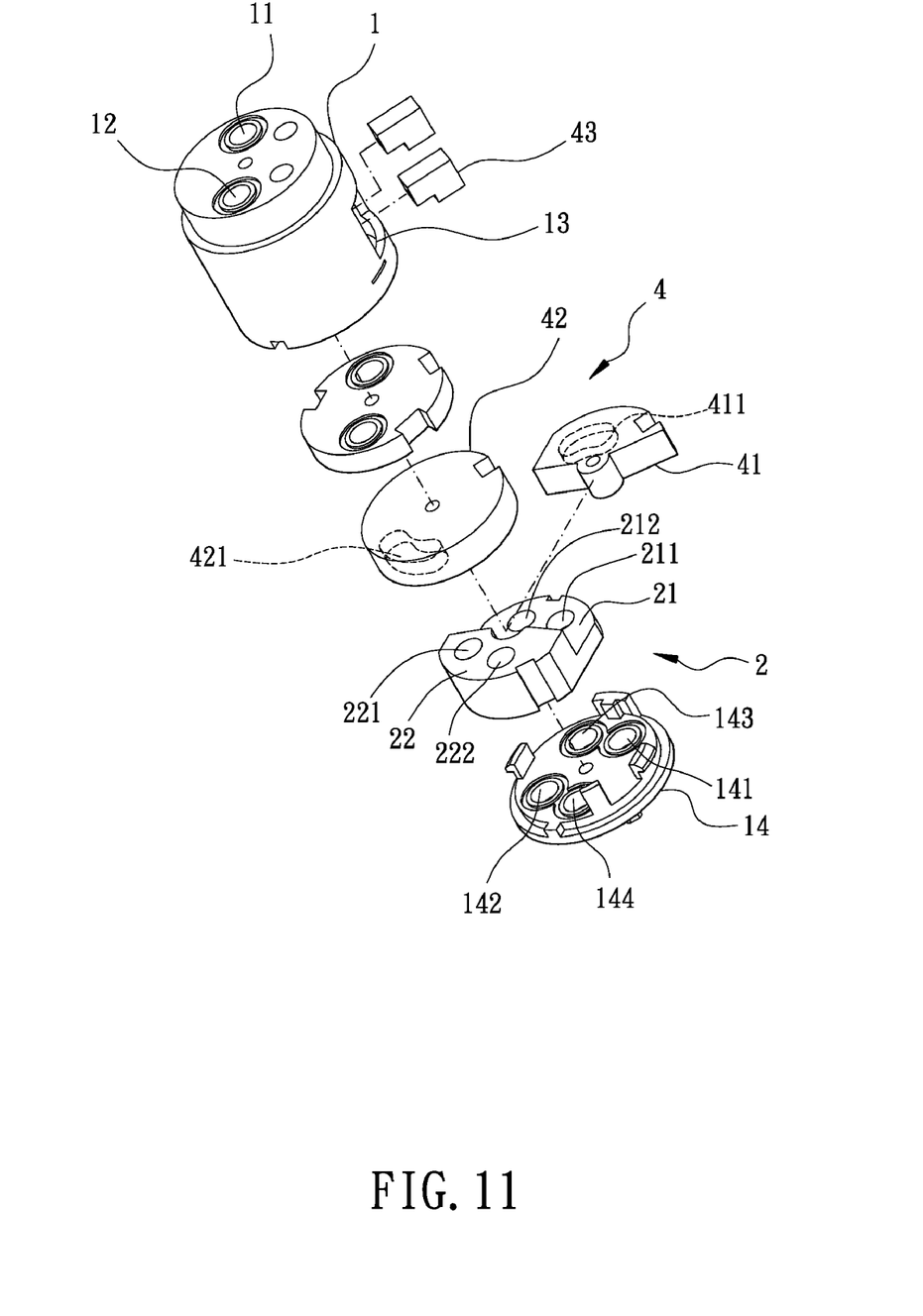
FIG. 11 is an exploded perspective view of a second embodiment of the valve for the water faucet in accordance with the present invention.
Figure 12:
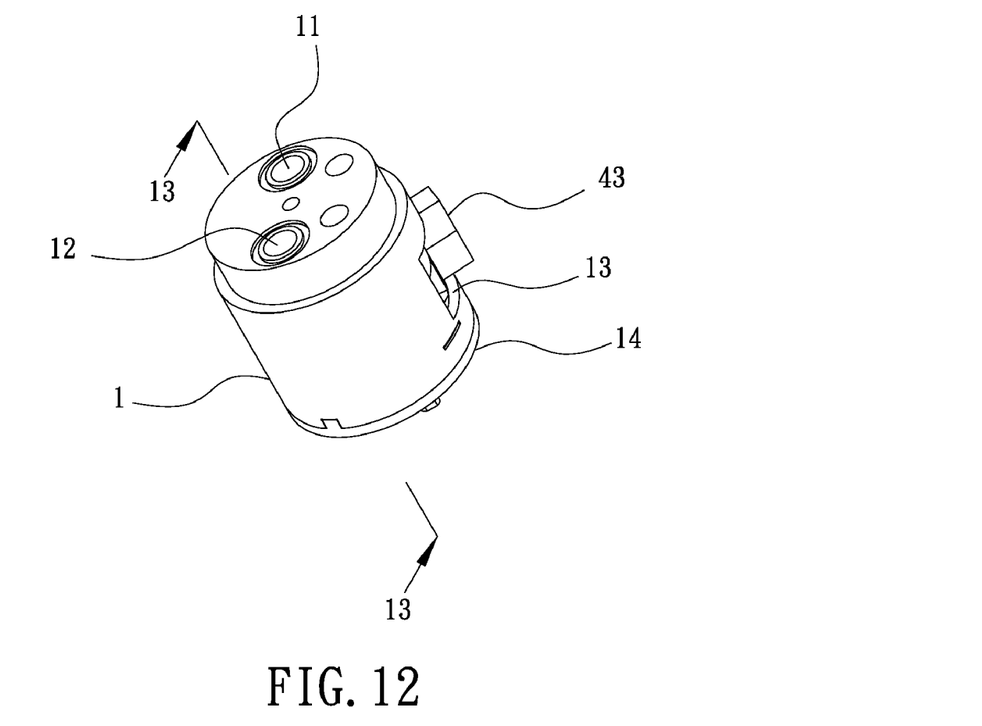
FIG. 12 is an assembled perspective view of the second embodiment of the valve for the water faucet in accordance with the present invention.
Figure 13:
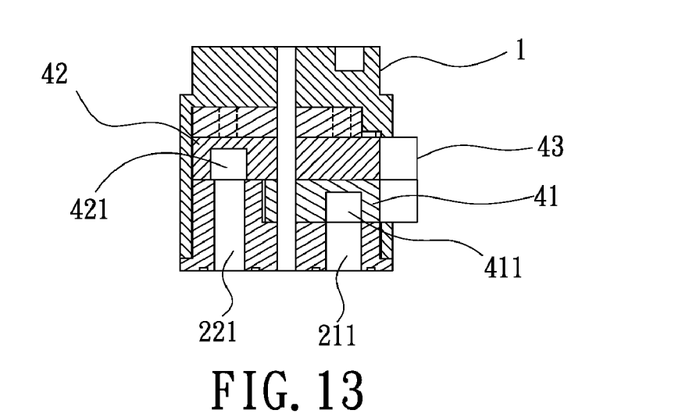
FIG. 13 is a cross-sectional view of the second embodiment of the valve for the water faucet in accordance with the present invention taken along the line 13-13 in FIG. 12.
Figure 14:
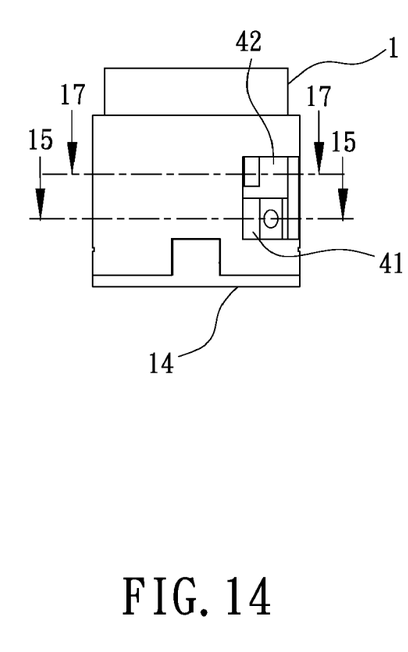
FIG. 14 is a side plan view in FIG. 12.
Figure 15:
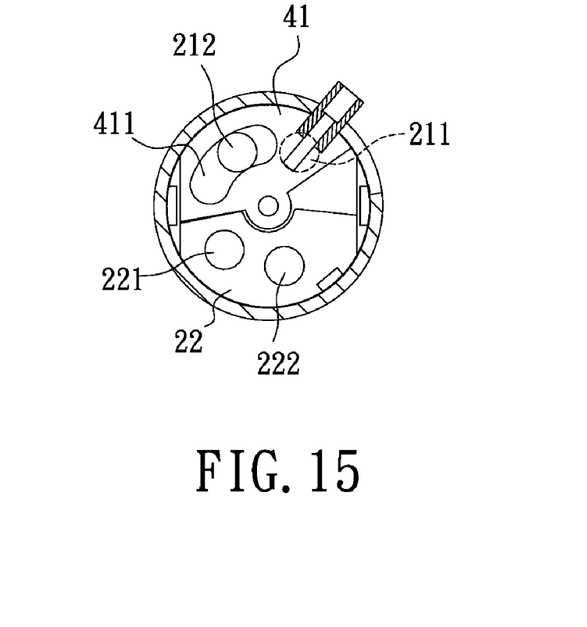
FIG. 15 is a cross-sectional operational view of the second embodiment of the valve for the water faucet in accordance with the present invention taken along the line 15-15 in FIG. 14.
Figure 16:
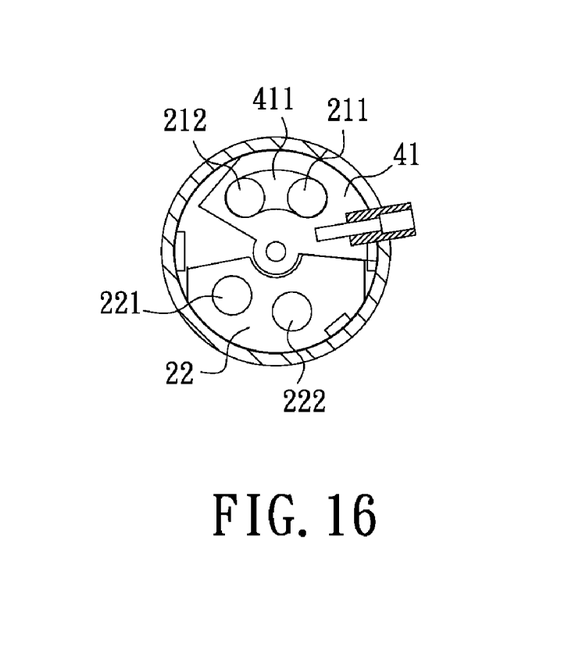
FIG. 16 is an operational view of the pivotable valve in FIG. 15 when the pivotable valve is pivoted.
Figure 17:
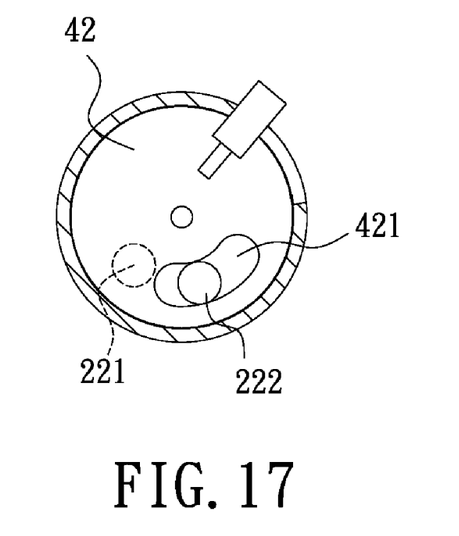
FIG. 17 is a cross-sectional operational view of the second embodiment of the valve for the water faucet in accordance with the present invention taken along the line 17-17 in FIG. 14.
Figure 18:
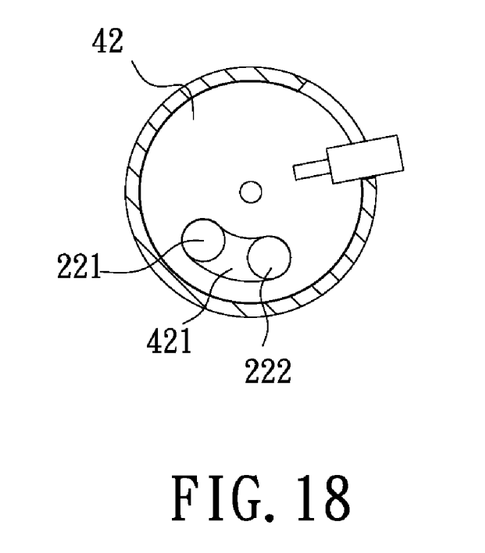
FIG. 18 is an operational view of the rotatable valve in FIG. 17 when the rotatable valve is rotated.

With reference to FIGS. 11-13, that shows a second embodiment of the valve for a water faucet in accordance with the present invention comprises the base (14), the seat (2) unrotatably mounted on base (14), a second valve set (4) mounted on the base (14), the disk (5) unrotatably mounted on the second valve set (4), and the housing (1) mounted on the disk (5). The base (14), the seat (2), the disk (5), and the housing (1) of the second embodiment are the same with those of the first embodiment. The elements and effects of the second embodiment which are the same with the first embodiment are not described, only the differences are described. The second valve set (4) includes a pivotable valve (41) pivotally mounted on the first portion (21) of the seat (2) and a rotatable valve (42) rotatably mounted on the second portion (22) of the seat (2). The pivotable valve (41) has a fan-shaped structure. The pivotable valve (41) has a first curved groove (411) defined in a bottom thereof. The first curved groove (411) is communicated with the third inlet hole (212) in the seat (2) and selectively communicated with the first outlet hole (211) in the seat (2). The pivotable valve (41) has a pivot being co-axial with an axle of the rotatable valve (42). The rotatable valve (42) has a second curved groove (421) defined in a bottom thereof. The second curved groove (421) is communicated with the fourth inlet hole (222) and selectively communicated with the second outlet hole (221).

When operating, as FIGS. 14-18 shown, the third guiding hole (143) and the fourth guiding hole (144) in the base (14) are respectively connected to a water supply (not shown) for adapting to a bottom-to-bottom faucet system (not shown). The third guiding hole (143) in the base (14) is communicated with the first curved groove (411) in the pivotable valve (41) via the third inlet hole (212) in the seat (2). When the pivotable valve (41) is restrictedly pivoted toward the fourth inlet hole (222) in the seat (2), the first outlet hole (211) is communicated with the first curved groove (411) such that the third guiding hole (143) in the base (14) is communicated the first guiding hole (141) in the base (14) via the third inlet hole (212), the first curved groove (411), and the first outlet hole (211). When the pivotable valve (41) is restrictedly pivoted toward the second outlet hole (221) in the seat (2), the first outlet hole (211) is blocked by the pivotable valve (41) such that the third guiding hole (143) in the base (14) is not communicated the first guiding hole (141) in the base (14). When the rotatable valve (42) is restrictedly clockwise rotated, the second curved groove (421) is communicated with the second outlet hole (221) in the seat (2) such that the second guiding hole (142) in the base (14) is communicated with the fourth guiding hole (144) in the base (14) via the second outlet hole (221), the second curved groove (421), and the fourth inlet hole (222). When the rotatable valve (42) is restrictedly counter-clockwise rotated, the second outlet hole (221) is blocked by the rotatable valve (42) such that the second guiding hole (142) in the base (14) is not communicated with the fourth guiding hole (144) in the base (14).

Although the invention has been explained in relation to its preferred embodiment, it is to be understood that many other possible modifications and variations can be made without departing from the spirit and scope of the invention as hereinafter claimed.

What is claimed is:

1. A valve for a water faucet comprising:
   a seat, the seat including a first portion formed thereon and a second portion upwardly extending from the first portion, the first portion having a first outlet hole defined therein and extended therethrough, the first portion having a third inlet hole defined therein and extended therethrough, the second portion of the seat having a second outlet hole defined therein and extended therethrough, the second portion having a fourth inlet hole defined therein and extended therethrough;
   a first valve set mounted on the seat, the first valve set including a pivotable valve pivotally mounted on the first portion of the seat and a rotatable valve rotatably mounted on the second portion of the seat, the pivotable valve having a first groove defined in a top thereof, the first groove having a first through hole defined in a bottom thereof and extended therethrough for selectively communicating with the first outlet hole in the seat, the rotatable valve having a second groove defined in a top thereof, the second groove having a second through hole defined in a bottom thereof and extended therethrough for selectively communicating with the second outlet hole in the seat, the rotatable valve having a third groove defined in the top thereof and extended therethrough, the third groove in the rotatable valve communicated with the first groove in the pivotable valve; and
   a housing mounted on the first valve set, the first valve set and the seat sequentially received in the housing, the housing having a first inlet and a second inlet defined in a top thereof and extended therethrough for respectively communicating with the third groove and the second groove in the rotatable valve;
   wherein when the pivotable valve is pivoted, the first through hole in the first groove in the pivotable valve selectively communicates with the first outlet hole in the first portion of the seat such that the first inlet in the housing selectively communicates with the first outlet hole in the seat;
   when the rotatable valve is rotated, the second through hole in the second groove in the rotatable valve selectively communicates with the second outlet hole in the second portion of the seat such that the second outlet in the housing selectively communicates with the second outlet hole in the seat.

2. The valve for the water faucet as claimed in claim 1, wherein the first groove in the pivotable valve is curved.

3. The valve for the water faucet as claimed in claim 1, wherein the second groove in the rotatable valve is curved.

4. The valve for the water faucet as claimed in claim 1, wherein the third groove in the rotatable valve is curved.

5. The valve for the water faucet as claimed in claim 1, wherein the housing has an opening laterally defined therein, the first valve set positioned in the opening in the housing, two adjusting bars respectively and laterally assembled with the rotatable valve and the pivotable valve of the first valve set via the opening in the housing.

6. The valve for the water faucet as claimed in claim 1 further comprising a base having four guiding holes respectively defined therein and extended therethrough for guiding water, the seat unrotatably mounted on the base, each of the first outlet hole, the second outlet hole, the third inlet hole, the fourth inlet hole communicated with a corresponding one of the four guiding holes.

7. The valve for the water faucet as claimed in claim 1 further comprising a disk mounted on the rotatable valve of the first valve set, the disk having two holes defined therein and extending therethrough, the two holes respectively communicated with the second curved groove and the third curved groove, the first inlet and the second inlet in the housing respectively communicated with a corresponding one of the two holes in the disk.

8. A valve for a water faucet comprising:
   a seat, the seat including a first portion formed thereon and a second portion upwardly extending from the first portion, the first portion having a first outlet hole defined therein and extended therethrough, the first portion having a third inlet hole defined therein and extended therethrough, the second portion of the seat having a second outlet hole defined therein and extended therethrough, the second portion having a fourth inlet hole defined therein and extended therethrough;
   a second valve set mounted on the seat, the second valve set including a pivotable valve pivotally mounted on the first portion of the seat and a rotatable valve rotatably mounted on the second portion of the seat, the pivotable valve having a first groove defined in a bottom thereof, the first groove communicated with the third inlet hole in the seat and selectively communicated with the first outlet hole in the seat, the rotatable valve having a second groove defined in a bottom thereof, the second groove communicated with the fourth inlet hole and selectively communicated with the second outlet hole; and
   a housing mounted on the second valve set, the second valve set and the seat sequentially received in the housing, the housing having a first inlet and a second inlet defined in a top thereof and extended therethrough;
   wherein when the pivotable valve is pivoted, the first outlet hole selectively communicates with the first groove such that the first outlet hole in the seat selectively communicates with the third inlet hole in the seat via the first groove in the pivotable valve;
   when the rotatable valve is rotated, the second groove selectively communicates with the second outlet hole in the seat such that the second outlet hole in the seat selectively communicates with the fourth inlet hole in the seat via the second groove in the rotatable valve.

9. The valve for the water faucet as claimed in claim 8, wherein the first groove in the pivotable valve is curved.

10. The valve for the water faucet as claimed in claim 8, wherein the second groove in the rotatable valve is curved.

11. The valve for the water faucet as claimed in claim 8, wherein the housing has an opening laterally defined therein, the second valve set positioned in the opening in the housing, two adjusting bars respectively and laterally assembled with the rotatable valve and the pivotable valve of the second valve set via the opening in the housing.

12. The valve for the water faucet as claimed in claim 8 further comprising a base having four guiding holes respectively defined therein and extended therethrough for guiding water, the seat unrotatably mounted on the base, each of the first outlet hole, the second outlet hole, the third inlet hole, the fourth inlet hole communicated with a corresponding one of the four guiding holes.

13. The valve for the water faucet as claimed in claim 8 further comprising a disk mounted on the rotatable valve of the second valve set, the disk having two holes defined therein and extending therethrough.

* * * * *